(12) United States Patent
Tartaglia et al.

(10) Patent No.: US 7,937,245 B2
(45) Date of Patent: May 3, 2011

(54) RENDERING OF SUBSURFACE SCATTERING EFFECTS IN TRANSLUCENT OBJECTS

(75) Inventors: Bruce Nunzio Tartaglia, Santa Monica, CA (US); Alexander P. Powell, Glendale, CA (US)

(73) Assignee: Dreamworks Animation LLC, Glendale, CA (US)

( * ) Notice: Subject to any disclaimer, the term of this patent is extended or adjusted under 35 U.S.C. 154(b) by 510 days.

(21) Appl. No.: 12/061,435

(22) Filed: Apr. 2, 2008

(65) Prior Publication Data
US 2009/0254293 A1 Oct. 8, 2009

(51) Int. Cl.
*H03F 1/26* (2006.01)
*G06K 9/00* (2006.01)
*G01D 18/00* (2006.01)

(52) U.S. Cl. .......................... 702/189; 382/154; 702/85
(58) Field of Classification Search .................. 702/186, 702/188, 189; 345/419, 424, 426, 587, 588; 382/154
See application file for complete search history.

(56) References Cited

U.S. PATENT DOCUMENTS

| | | | |
|---|---|---|---|
| 6,760,024 | B1 | 7/2004 | Lokovic et al. |
| 7,536,047 | B2 | 5/2009 | Borshukov et al. |
| 2006/0028468 | A1* | 2/2006 | Chen et al. ................... 345/424 |

OTHER PUBLICATIONS

Jensen, Henrik Wann; Realistic Image Synthesis Using Photon Mapping, AK Peters, Ltd.; 1st edition, Jul. 15, 2001, Chapters 4-6.
Dachsbacher, et al., Translucent Shadow Maps, Eurographics Symposium 2003, The Eurographics Association, pp. 197-201, 311.
D'Eon, E. et al. (Jun. 25, 2007). "Efficient Rendering of Human Skin," *Rendering Techniques 2007: 18th Symposium on Rendering*, Grenoble, France, pp. 147-157.
European Search Report and written opinion mailed Aug. 11, 2009, for EP Application No. 09250808 filed on Mar. 23, 2009, 8 pages.
European Search Report and Written Opinion mailed Aug. 13, 2010 for 08253294 filed Oct. 9, 2008, 10 pages.
Lokovic et al. (Jul. 2000). "Deep shadow maps", *Proceedings of the 27th annual conference on Computer graphics and interactive techniques*, pp. 385-392.
Partial European Search Report received for European Patent Application No. 08253294.6, mailed on Apr. 26, 2010, 6 pages.
Office Action received for European Patent Application No. 09250808.4, mailed on Jan. 19, 2011, 6 pages.

* cited by examiner

*Primary Examiner* — John H Le
(74) *Attorney, Agent, or Firm* — Morrison & Foerster LLP

(57) ABSTRACT

Embodiments are directed to modifying an existing scheme for providing translucent illumination in order to take account of subsurface scattering. The color of a selected point of a translucent object can be determined using existing methods. The existing methods need not take subsurface scattering into account. Then, a contribution to the color at the selected point due to subsurface scattering may be calculated. The contribution due to subsurface scattering may be calculated based on a photon map. Embodiments of the invention also include the use of different types of photon maps. In some embodiments, a standard photon map may be used. In other embodiments, a photon map may be defined in a manner similar to a depth map. Thus, the entries of a photon map may be defined in terms of an angle from a light source and a distance between an object's surface and a light source.

19 Claims, 9 Drawing Sheets

RENDERING OF SUBSURFACE SCATTERING EFFECTS IN TRANSLUCENT OBJECTS

BACKGROUND

1. Field

This application relates to the electronic rendering of images and movies in general and more specifically to the shading of translucent objects.

2. Related Art

Computer graphics are used in various fields, such as animation, computer games, etc. An important goal of computer graphics is the ability to generate virtual images that are realistic and/or esthetic. A major impediment to reaching this goal is the inherent computational limitations of existing computer systems.

More specifically, lighting continues to pose challenges in the field of computer graphics. Naturally, light is an important factor in how one perceives an image. An observer (e.g., a human eye or a camera) perceives an object by detecting light reflected from that object. In other cases, the light may be passing (or transmitted) through the object or be refracted by the object instead. The light detected from an object may be classified in two types. Direct light is light that travels directly from a light source to the object and to the observer. Indirect light is light that does not travel directly from a light source to the object. For example, indirect light may be light that is reflected from another object before it reaches the object being observed. Alternatively, indirect light may be light that goes through a translucent object before reaching the object being observed.

In the real world, much of the light that we use to perceive the world around us is indirect light. Thus, we can usually see objects that are not directly exposed to a particular light source. For example, in a bright day, a room with a window is usually well-illuminated even if the sun does not directly shine through the window, because the sun's rays reflect from the surrounding scenery and pass through the window, thus illuminating the room.

Considering the above, a perfect computer graphics system would be able to track indirect light to ensure realistic illumination of objects. Unfortunately, for most situations, such a system would be impractical as it would require a very large amount of computing resources. In order to account for indirect light, one has to trace each light ray (or photon) from a light source and off of all objects from which it reflects (this is sometimes referred to as ray tracing). Considering the incredibly large number of photons illuminating a scene, and the complex paths each photon may take when being reflected of various objects in a scene, this is not practical.

For the above reasons, many current computer graphics systems are direct light systems. In other words, they usually only take into account light going directly from a light source to an observed object when calculating how that object should be displayed. While using a direct light system significantly reduces computational costs, these systems may, in certain situations, create images that are very unrealistic.

For example, direct light systems do not correctly render translucent objects, without further modifications. A translucent object is an object which allows light to pass through it and modifies the light as it passes through it. Thus, seeing a translucent object usually involves seeing at least some of the light that passes through the object. However, light that passes through an object is not considered direct light by the standard direct light models and is thus not rendered by systems employing these models. In other words, systems utilizing standard direct light models usually render translucent objects as being completely opaque. This is naturally undesirable.

Some direct light systems render translucent objects by performing some type of ray tracing for these objects. Thus, these direct light systems depart from the direct light model when rendering translucent objects, in order to correctly convey the translucency of these objects. This is done under the assumption that translucent objects are relatively rare, therefore the additional computational requirements for performing ray tracing for these objects would not be too high. However this method cannot be efficiently employed in scenes in which large numbers of translucent objects exist.

U.S. patent application Ser. No. 11/975,031 entitled "SHADING OF TRANSLUCENT OBJECTS" and filed on Oct. 16, 2007 (incorporated by reference herein in its entirety and referred to as the '031 application hereafter) discloses methods and systems for providing translucent illumination by utilizing depth maps. The '031 application allows for the use of a relatively computationally efficient direct light model to provide authentic illumination for translucent objects. While the methods and systems of the above application are generally quite effective, they do not take into account one particular quality of translucent objects—subsurface scattering. Subsurface scattering refers to the fact that the color of a particular point in a translucent object is often related to the illumination received by other proximate points. This phenomenon is explained in more detail below.

While the above discussion centers on the desirability of realism in computer graphics, it should be noted that in many cases realism need not be the over-riding goal of a computer graphics system. It is well accepted that an image created by a talented artist may be much more compelling than the real image the artist based his composition on. Many computer graphics systems are used to assist artists in creating images or video. Thus, while realism is always a desirable quality of a computer graphics system it is also often desirable that the system offer sufficient artistic control as to allow an artist to create compelling visuals even if these visuals are not strictly realistic.

What is needed is a scheme for rendering translucent objects that does not impose very high computational requirements, and takes subsurface scattering into account.

SUMMARY

Embodiments of the present invention are directed to modifying an existing scheme for providing translucent illumination in order to take account of subsurface scattering. The color of a selected point of a translucent object is determined using existing methods. The existing methods may be, for example, the methods discussed in the '031 application mentioned above. The existing methods need not take subsurface scattering into account at all. Alternatively, the existing methods may take subsurface scattering into account to a certain extent but not adequately.

Then, a contribution to the color at the selected point due to subsurface scattering may be calculated. The contribution due to subsurface scattering may be calculated based on a photon map. Entries of the photon map representing points close to the selected point can be used to provide an estimate of the contribution of subsurface scattered light. In addition, entries of the photon map representing points close to a point or points that indicate where light that reaches the selected point enters the translucent object can also be taken into account when calculating the contribution associated with subsurface scattering. Naturally, multiple selected points can be thus processed in order to render a scene.

Embodiments of the present invention also include the use of different types of photon maps. In some embodiments, a standard photon map may be used. In a standard photon map, each entry may be associated with a respective set of coordinates. In other embodiments, a photon map may be defined in a manner similar to a depth map. Thus, the entries of a photon map may be defined in terms of an angle from a light source and a distance between an object's surface and a light source.

DETAILED DESCRIPTION OF THE PREFERRED EMBODIMENT

In the following description of preferred embodiments, reference is made to the accompanying drawings which form a part hereof, and in which it is shown by way of illustration specific embodiments in which the invention may be practiced. It is to be understood that other embodiments may be utilized and structural changes may be made without departing from the scope of the preferred embodiments of the present invention.

In the following description, a "ray of light" is an abstraction used for computational purposes. It signifies a line in space through which light travels, and need not be associated with a single photon. The number of rays of light emitted by a single light source may vary and depend on the desired resolution of the scene. However, this number is usually much smaller than the number of actual photons emitted by a real source of light.

Figure 1:
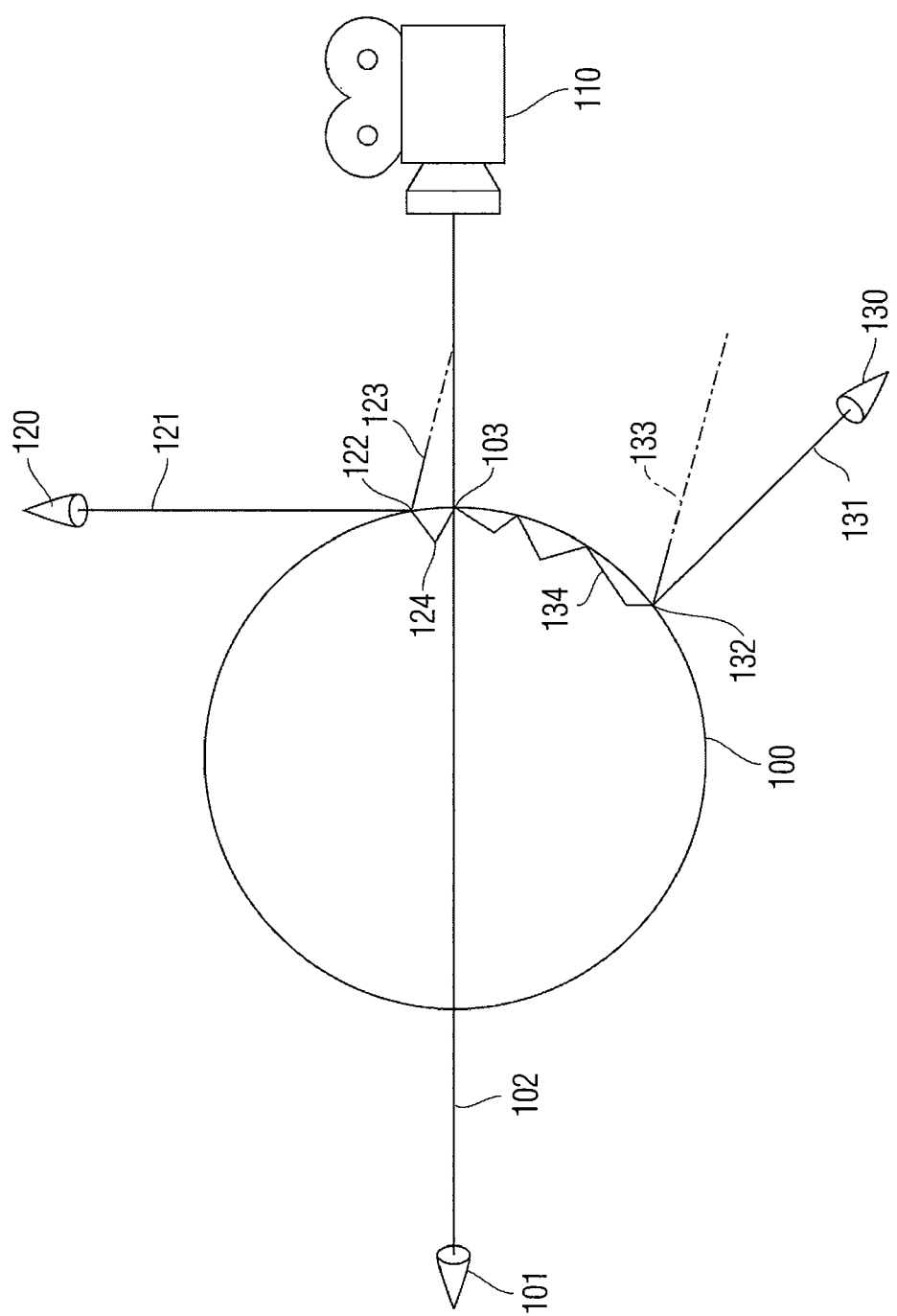
FIG. 1 is an illustration of subsurface scattering in a translucent object.

Embodiments of the present invention are directed to modifying an existing scheme for providing translucent illumination (such as, for example, the scheme of the '031 application) in order to take account of subsurface scattering. An example of subsurface scattering is illustrated in FIG. 1. FIG. 1 shows a translucent object 100 viewed by camera 110. Light ray 102, generated from light source 101, may travel through the object and reach surface point 103. Many existing models (such as for example the modified direct illumination model of the '031 application) would calculate the color of point 103 solely based on the illumination of ray 102 as well as any other rays that directly illuminate point 103.

However, due to common qualities of translucent objects, rays that illuminate points that are in proximity to point 103 may also affect the color of point 103. For example, one may consider ray 121 of light source 120 and ray 131 of light source 130. For the purposes of FIG. 1 only, it may be assumed that light sources 130 and 120 do not directly illuminate point 103. Instead, ray 131 directly illuminates point 132 while ray 121 directly illuminates point 122. Each of these rays creates a reflection from the surface of the object (rays 123 and 133, respectively). However, since object 100 is translucent, some of the energy of both rays can penetrate the surface of the object and propagate within the object. There, it can travel in various paths within the object (it can also split up further, etc) depending on the optical properties of the object's inner material.

Therefore, 124 and 134 are example light ray paths that can be formed from rays 121 and 131, respectively. Inner rays such as these can travel through the object through various paths and exit the surface at point 103. Thus, they can contribute to the color at point 103. Therefore, the color of point 103 can depend upon light that initially illuminates the object at points different than point 103. This phenomenon is referred to as subsurface scattering.

Subsurface scattering is most notable for points that are in close proximity. Thus, rays that illuminate the object at points relatively close to point 103 are likely to be the most significant contributions to any changes of the color of point 103 due to subsurface scattering.

Figure 2:
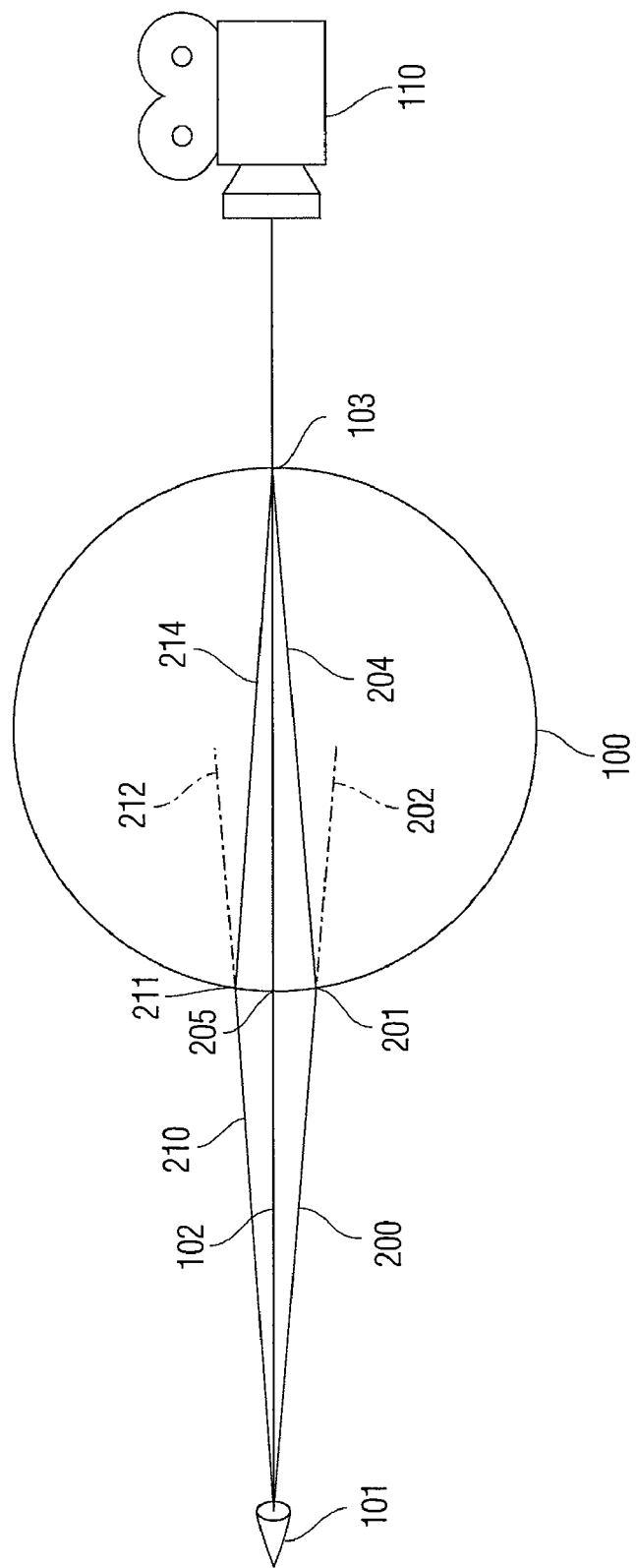
FIG. 2 is another illustration of subsurface scattering in a translucent object.

FIG. 2 shows another example of subsurface scattering. In FIG. 2, light source 101 again illuminates object 100. Light ray 102 again goes through object 100 and reaches point 103 at its opposite side. It is also noted that light ray 102 enters the object at point 205. Two additional light rays from light source 101 (light rays 200 and 210) are also considered. These rays reach the surface of object 100 at points 201 and 211, respectively. Then, the rays continue through the object as rays 202 and 212 respectively. However, some of the energy of each ray may be refracted from the surface into rays 204 and 214, respectively. These rays may reach the other end of the object at point 103—the same point at which ray 102 reaches the end of the object.

Thus, in this second example, the illumination at point 103 depends on rays that would not be considered to reach point 103 for most direct light illumination models (including the model of the '031 application). It should be noted that in this example the illumination at point 103 does not depend on light that enters the object close to it (as in FIG. 1), but on light that enters the object close to the point where ray 102 enters the object (i.e., point 205). More specifically, light rays 200 and 210 which enter the object at points 211 and 201 which are close to point 205 affect the illumination of point 103.

Since subsurface scattering is caused by indirect light, many direct lighting models (such as the model of the '031 application) do not take its effects into account. Ray tracing models may take subsurface scattering effects into account but, as noted above, these models tend to be computationally intensive. Embodiments of the present invention provide a relatively low cost modification of existing direct light models (such as, for example, the model of the '031 application) which allow for the effects of subsurface scattering to be rendered. Additionally, embodiments of the present invention may also be used with other types of models that do not adequately take subsurface scattering into account.

Figure 3:
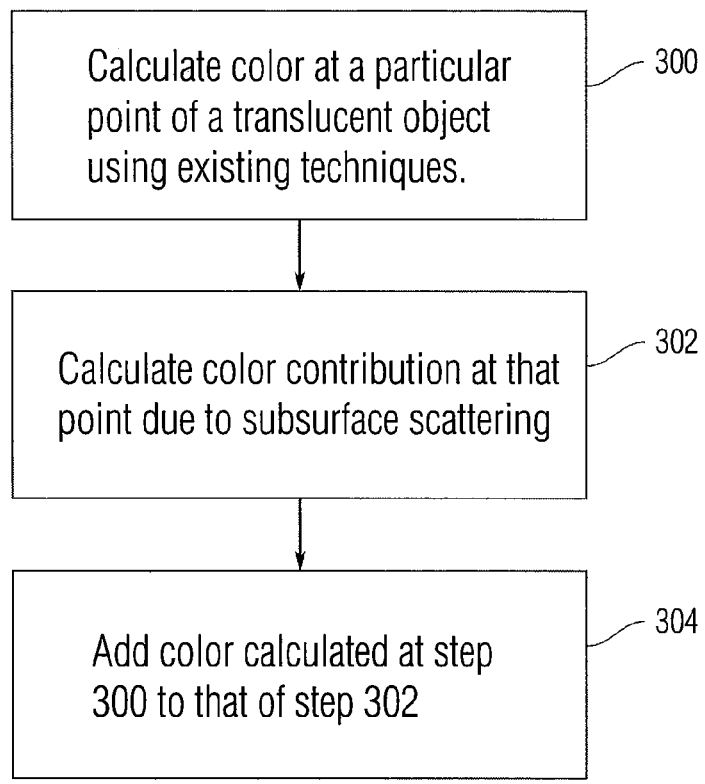
FIG. 3 is a diagram showing an exemplary method of utilizing embodiments of the present invention.

FIG. 3 is a diagram of an exemplary method of utilizing embodiments of the present invention. At step 300, the color at a particular pixel in a translucent object is calculated utilizing existing techniques. These may include various direct illumination methods. They may include the direct illumination methods described in the '031 application. The techniques used in step 300 may be techniques that do not take subsurface scattering into account (as this may be calculated by embodiments of the present invention). Alternatively, the techniques of step 300 may take subsurface scattering into account to some extent but not to an extent that is considered sufficient or desirable. Step 300 may be referred to as the determination of the first order color value.

At step 302, the color contribution at the particular pixel of step 300 due to subsurface scattering is calculated. The details of this calculation are discussed below. This may be referred to as the subsurface scattering color determination, or the second order color determination. At step 304, the colors of steps 300 and 302 are added to obtain a final color for the pixel.

The order of execution of steps 300 and 302 may be reversed. In some embodiments, steps 300 and 302 may calculate illuminations levels instead of final colors.

The value obtained at step 300 is referred to as first order color determination, because it is usually intended to provide a first approximation of the correct color. The subsurface scattering calculation is intended to provide a correction to the first approximation that takes subsurface scattering into account.

As discussed herein, adding colors may refer to adding their component values. As known in the art, a color can be defined by a plurality of component values (usually three) each of which defines the brightness of one of a plurality of component colors (usually Red, Green and Blue) that can combine to form the color. Adding two colors simply involves adding their respective component values.

Figure 4:
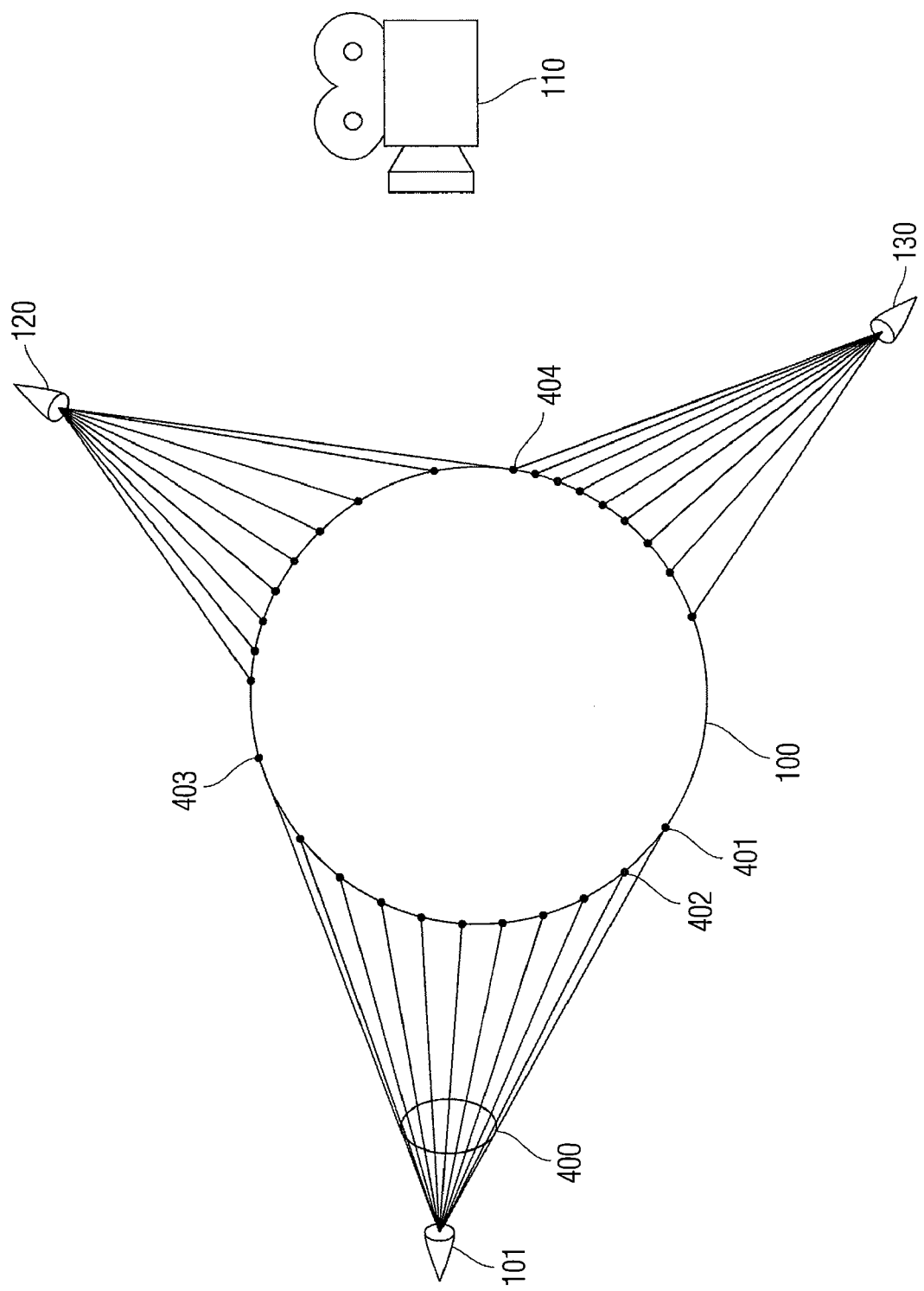
FIG. 4 is a diagram showing the generation of a photon map according to some embodiments of the invention.

Embodiments of the invention utilize a data structure referred to as a photon map in order to perform subsurface scattering. FIG. 4 is a diagram showing the generation of a photon map according to exemplary embodiments of the invention. FIG. 4 shows a scene similar to that of FIG. 1. Again, light sources 101, 120 and 130 illuminate object 100.

According to some embodiments, the photon map is generated from the point of view of the light source. Accordingly, for each light source a plurality of light rays emitted by the light source is traced. For example, light rays 400 for light source 101 may be traced. Naturally, the traced light rays may encompass a three dimensional space.

The light rays that are traced may include rays that encompass the entire angular range of light produced by the light source. Light rays within certain predefined angular intervals of each other may be traced. The angular intervals may be based on a desired precision or granularity (e.g., lower intervals would result in more light rays and higher precision and granularity). In some embodiments, the angular intervals may depend upon the distance between the light source and an object (i.e., object 100) in order to ensure a desired special frequency of intersections of traced light rays and the object's surface.

The traced light rays may be traced to the first surface they intersect. Thus, light rays 400 may be traced to object 100. In some embodiments, traced light rays that are found to not intersect the surface of a translucent object are ignored and no further processing is performed for them (as embodiments of the present invention are centered on rendering translucent objects). In some embodiments, the light ray tracing step may be performed together with depth map generation, in order to improve efficiency. Depth map generation also usually requires that light rays of each light source are traced to the first surface they intersect.

For each light ray that is traced to intersect a translucent surface, the location of a point where that light ray intersects the surface is determined. These may include locations 401, 402, 403, etc. The location of each such intersecting point is saved in a memory structure referred to as a photon map.

In addition, the color of each intersecting point is determined. The color may be determined based on the intensity and color of the illumination provided by the traced light ray, the surface color of the illuminated surface and the angle of incidence of the light ray on the surface. In other words, the color may be determined based on the known formula for determining the color of a surface point directly illuminated by a known light ray. The color of each point is stored in the photon map along with its location. If a particular point is illuminated by two or more light rays, the color stored may be the color resulting from the combined illuminations of all illuminating rays.

It should be noted that while the above description mentions ray tracing, the presently described methods would not be ordinarily considered ray tracing by persons of skill in the art. Ray tracing usually requires that rays are traced beyond the first time they hit an obstacle. Thus, ray tracing usually requires the tracing of reflections and refractions of rays. On the other hand, the process discussed above only traces rays up to the first obstacle (e.g., translucent object 100) in order to create the photon map.

Figure 5:
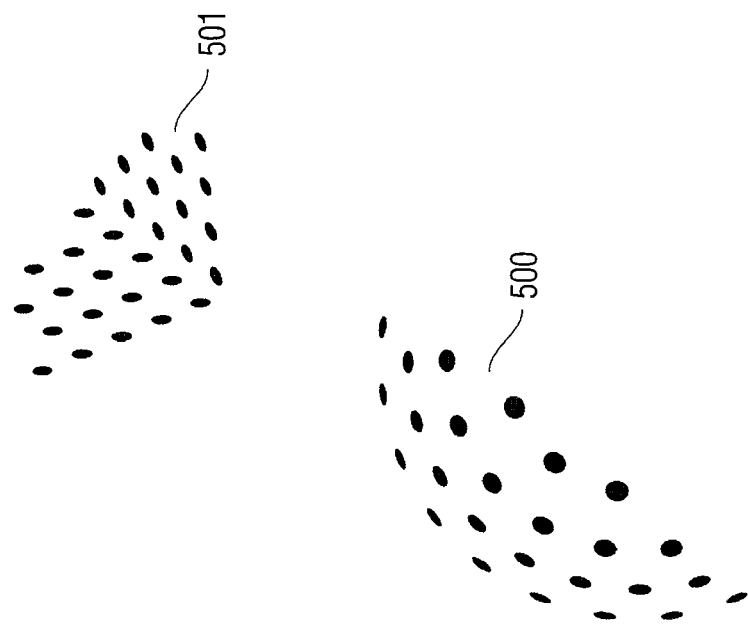
FIG. 5 is a visual representation of data stored in an exemplary photon map according to some embodiments of the invention.

FIG. 5 is a visual representation of the data stored by an exemplary photon map. The photon map may define the three dimensional positions of a plurality of points 500 as well as their colors. Thus, the photon map of FIG. 5 may define a first group of points 500 that are part of a sphere and second group of points 501 that are part of a cube, etc. A single photon map may include points from the surfaces of several objects.

Figure 6:
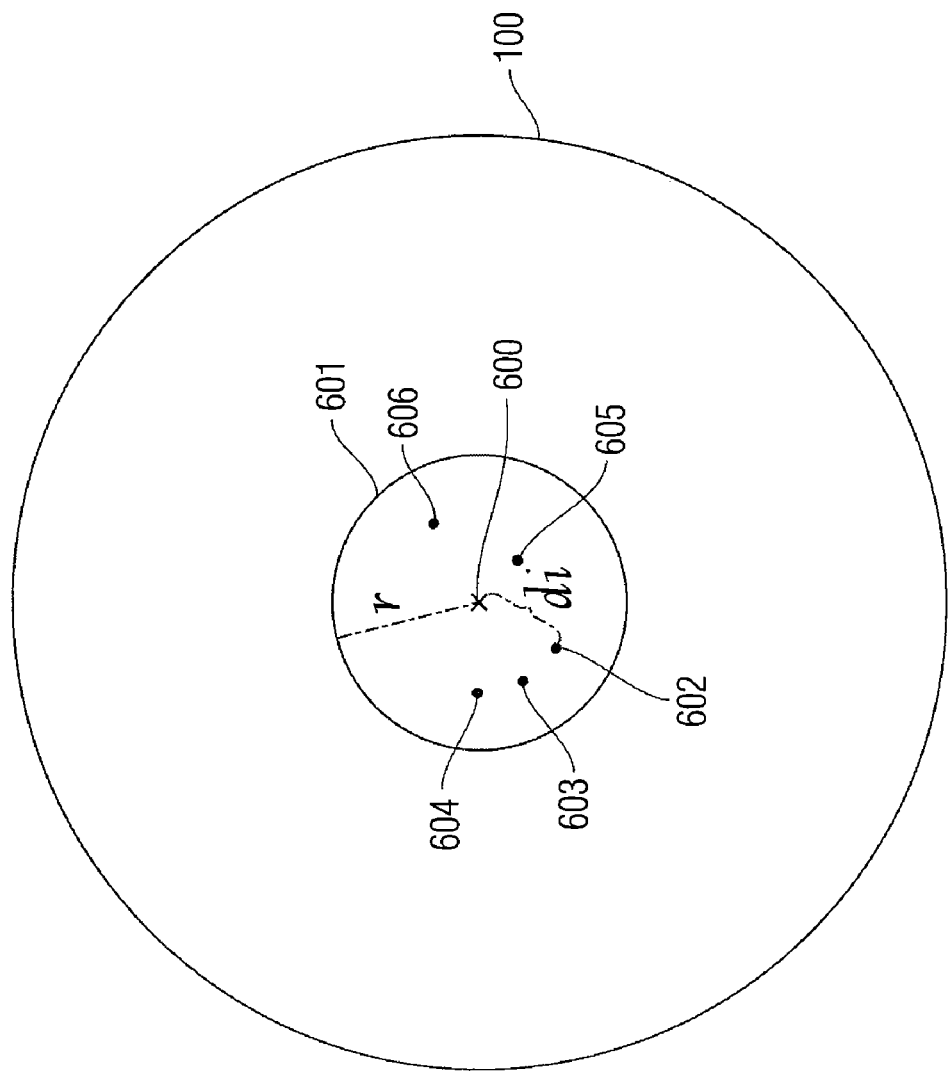
FIG. 6 is a diagram illustrating the second order color determination for a particular pixel according to some embodiments of the invention.

Once the photon map is formed, it is used to provide a second order color determination for a pixel of a translucent object that is being rendered in order to account for subsurface scattering within that object. FIG. 6 is a diagram illustrating that process. Pixel 600 may be a pixel on the surface of translucent object 100 that is being rendered. Initially, the depth map is examined to select a set of points within the depth map that are within a predefined threshold distance r of pixel 600. Distance r may be measured along the surface of object 100. Alternatively, distance r may be measured in all three dimensions. Thus, the points of the depth map that are within a sphere 601 having radius r and pixel 600 as its center may be selected.

Next, the distance $d_i$ between each selected point and pixel 600 can be measured. While only one $d_i$ (the one for point 602) has been shown in FIG. 6 for clarity, a $d_i$ may exist for each selected point 602-606, the subscript "i" indicating a particular selected point. Next, the colors of the various points may be integrated. If each point has a color $c_i$, then the integration can be defined as:

$$C_{sec} = \Sigma D(c_i, d_i). \quad \text{EQ1}$$

In the above equation, the result $C_{sec}$ is a second order color for pixel 600. Or, in other words, it is a color which may be used to modify an initial color for pixel 600 in order to take into account light received by pixel 600 due to subsurface scattering. The summation is performed over all selected points (i.e., over all points within radius r). The function $D(x,y)$ is a decay function that decays (i.e., decreases the intensity of) color x based on number y and returns a color. Thus, the higher the value of y, the less intense the color returned by the function is. The decay function may be one of many known decay functions. For example, it may be a linear, parabolic, Gaussian, etc. decay function. It may include one of the various decay functions discussed in the '031 application.

A color may be multiplied by a scalar (for the purposes of calculating a decay function, for example) by multiplying each of the three component color values of a color by the scalar. Adding colors may be performed by adding their component values (as discussed above).

Thus, the second order color may be obtained for a pixel by adding the decayed values of the colors of all points in the photon map within a predefined radius from the pixel. This may be a suitable and efficient representation of the subsurface scattered light that may reach pixel 600. The colors of the various selected points 602-606 may represent the colors of various rays that may be scattered below the surface of the translucent object 100. The decay of these colors may represent the decay these rays experience before they reach pixel 600.

The second order color thus obtained may be added to a first order color obtained by a known method in order to take into account subsurface scattering. In some embodiments, the second order color may be further modified (e.g., it may be scaled) before being added to the first order color.

While the process discussed above may be used by some embodiments, it should be noted that it only takes into account subsurface scattering of the type shown in FIG. 1 and probably does not take into account the longer range subsurface scattering shown in FIG. 2. With reference to FIG. 2, in order for the scattered light from rays 200 and 210 to be taken into account by the above discussed method, points 201 and 211 must be added in the integration of EQ1. However, points 201 and 211 are so far removed from the pixel that is being rendered (which is positioned at point 103), that they would probably not be considered as they would probably not be within radius r of the pixel.

Figure 7:
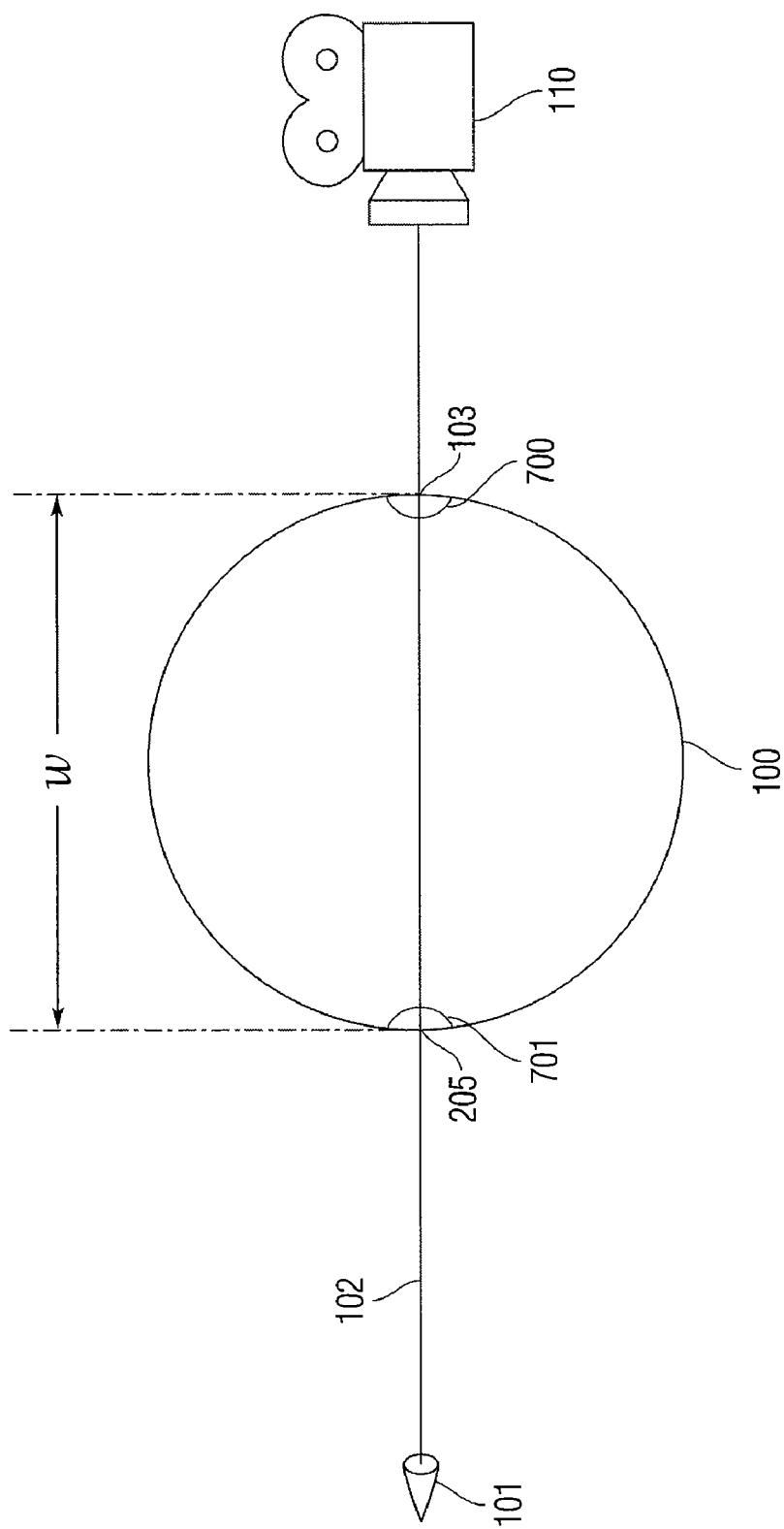
FIG. 7 is a diagram illustrating another second order color determination scheme according to some embodiments of the invention.

Another method for determining the second order color which addresses the above concern is discussed below in connection with FIG. 7. FIG. 7 again shows light source 101 that emits ray 102 through object 100, the ray being eventually detected by camera 110. If the process discussed in connection with FIG. 6 above is performed for the pixel at point 103 (pixel 103), then all points in the photon map within area 700 will be integrated to obtain the second order color for point 103.

However, some embodiments also perform a similar integration at the other side of the object 100. Thus, all points within a predefined radius of point 205 (the point at which ray 102 initially enters the object 100) may be integrated according to equation EQ 1. This may cover all points within area 701. This second integration may be intended to take into account subsurface scattered light contributed from rays 200 and 210 as shown in FIG. 2. The radius of area 701 may or may not be the same of that of area 700.

Thus, the second order color obtained from the integration of area 700 at the camera side may be referred to as $C_{sec(cam)}$, while that performed at the light side may be referred to as $C_{sec(light)}$. A total second order color $C_{sec(tot)}$ may be obtained by the following formula:

$$C_{sec(tot)} = C_{sec(cam)} + D_2(C_{sec(light)}, w).\qquad \text{EQ2}$$

In this case $D_2$ is another decay function that may be identical or distinct from function D of EQ1. Again, function $D_2$ may include various decay functions including the examples provided above in the context of function D as well as the examples provided in the '031 application. Furthermore, function $D_2$ may be modified to take into account empty spaces within object 100, as discussed in the '031 application. The parameter w is the distance between points 205 and 103. In other words, it may be the distance ray 102 travels within object 100. The $D_2$ function is intended to decay the light side second order color value $C_{sec(light)}$ in order to reflect the fact that light that has been scattered on the light source side (e.g., scattered rays 204 and 214 of FIG. 2) may need to travel a longer distance w to reach the rendered pixel 103.

In some embodiments, a different decay function D may be used in EQ1 when calculating $C_{sec(light)}$ than the one used when calculating $C_{sec(cam)}$. In some embodiments, the decay function used when calculating $C_{sec(light)}$ may be such that it does not decay as sharply as the one used when calculating $C_{sec(cam)}$.

If pixel 103 is illuminated by multiple light sources that all send rays through object 101, then multiple $C_{sec(light)}$ values may be calculated for each light source. These values may then be individually decayed and added to the $C_{sec(cam)}$ value as shown below:

$$C_{sec(tot)} = C_{sec(cam)} + \Sigma D_2(C_{sec(light,i)}, w_i),\qquad \text{EQ3}$$

where $C_{sec(light,\,i)}$ is the second order color calculated for each light source and $w_i$ is the corresponding w value for each light source.

As discussed above, the total resulting second order color $C_{sec(tot)}$ may be added to a previously obtained first order color in order to take both types of subsurface scattered light into account.

Figure 8:
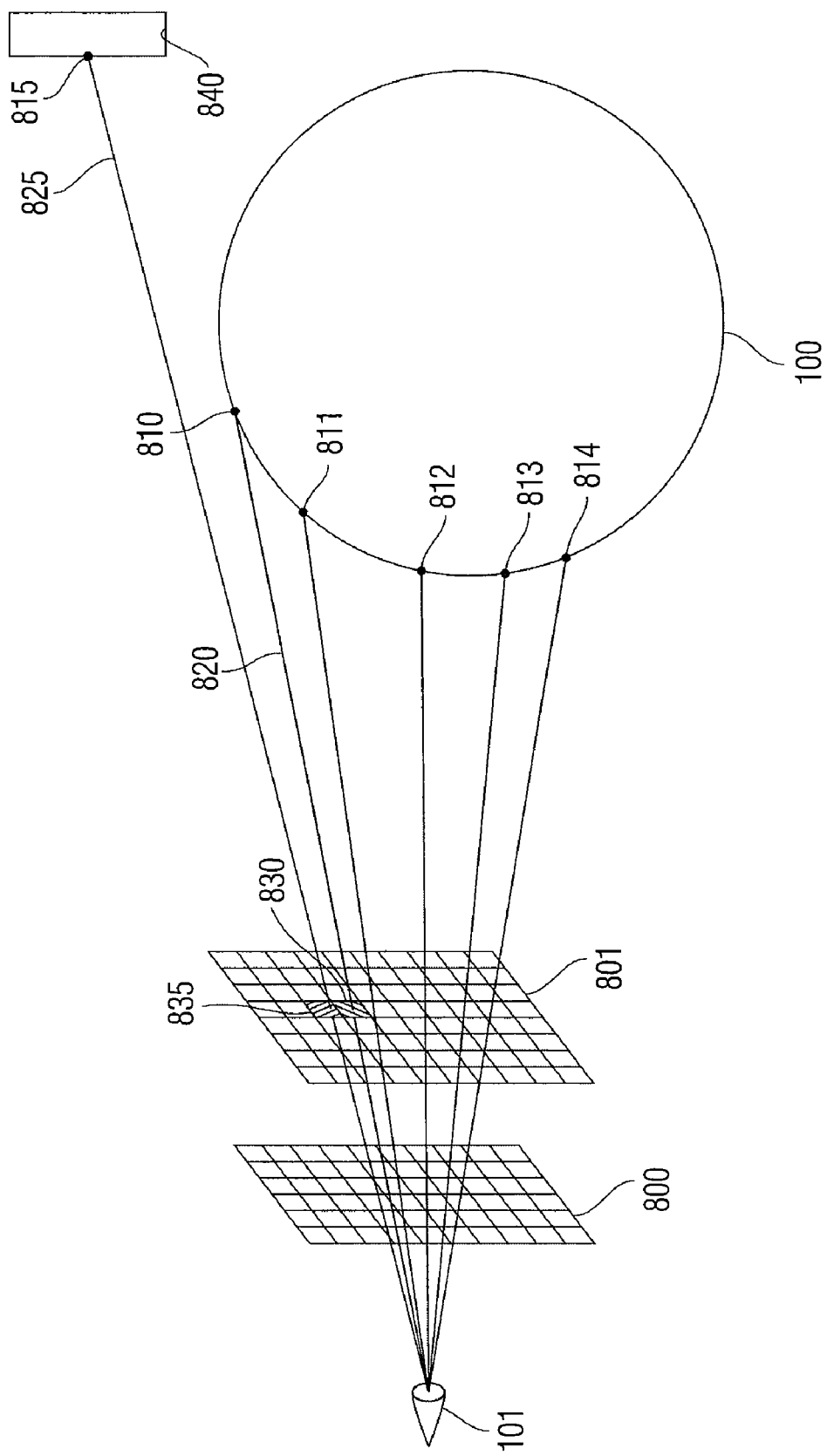
FIG. 8 is a diagram showing an alternative way of storing the photon map according to some embodiments of the invention.

FIG. 8 is a diagram showing an alternative method of storing the photon map. FIG. 8 shows the light sources 101 and the translucent object 100. Also shown is depth map 800. A depth map is well known concept in the art computer graphics. It is a two dimensional array, wherein each entry of the array is associated with a ray of light from light source 101. Each entry usually stores the distance its associated ray travels before hitting the closest surface. Depth maps are often utilized in direct light models. Usually, an entry may define a ray it is associated with by a relationship of the position of the entry in the array with the angular position of the ray as it is emitted from the light source.

The photon map may be organized in a manner similar to that of a depth map. More specifically, the photon map may be organized as a two dimensional array 801. Each entry in the array may correspond to a point that is to be saved in the photon map (e.g., one of points 810-814). The association between an entry of the photon map and an actual point may be defined by the angular position of the ray which reaches that point. Thus, ray 820 may reach point 810. The angular position of ray 820 may define the position of an entry 830 within the array 801. Thus, entry 830 of the photon map may be associated with point 810. A two dimensional photon map as the one shown in FIG. 8 may be referred to as a projected photon map.

Photon map 801 may store the color of each respective point. It need not store a three dimensional position for each respective point because that position is defined by the angle of the ray defined by the position of each entry within the photon map (as discussed above) and the surface of the translucent object 100. Thus, revisiting the above example, the position of entry 830 within the photon map 801 may define a ray 820. The intersection of ray 820 with the surface of object 100 may define the actual three dimensional position of point 810. Thus, entry 830 may define the three dimensional position of the point it is associated with (point 810) without explicitly storing that position.

The embodiment of FIG. 8 may greatly speed up the process of finding a group of points in the photon map that are within a predefined radius of the pixel that is to be rendered (see discussion of FIG. 6 for further details). For the three dimensional photon map of FIG. 5, a three dimensional search of pixels would need to be performed. A large number of points within the photon map may need to be examined in order to determine whether they are within the predefined radius of the pixel.

For the two dimensional photon map of FIG. 8, this process may be much faster. The pixel may be associated with a particular entry in the photon map 801 based on the angle a ray from light source 101 would need to have in order to reach the pixel. Then, the predefined radius may be converted into a number of positions in the photon map (alternatively, the predefined radius may be initially provided as a number of positions). Then, the group of points within the radius may be selected by selecting the entry in the photon map the pixel was associated with as well as all neighboring entries in the photon map placed within the number of positions associated with the predefined radius.

However, the photon map of FIG. 8 may add some complexities. For example, while the previously described photon map of FIG. 5 may be provided as a single data structure, the photon map of FIG. 8 may need to include several distinct arrays if several different light sources are present in the scene. Thus, when multiple light sources are present, multiple arrays may need to be checked in order to find all points within the predefined radius of a particular pixel.

A projected photon map may be provided in addition to the depth map, or may be stored in the same array as the depth map. The depth map may be used in order to improve the selection of entries in the photon map within a predefined radius of a pixel.

For example, point 815 of object 840 may also be present at the scene. Point 815 may be associated with entry 835 of the photon map by way of light ray 825. Since entry 835 is very close to entry 830 within the photon map (it borders it) a rendering system may erroneously assume that point 815 is very close to point 810 and include point 815 in the calculation of subsurface scattered light of point 810. However, this would not be correct as point 815 is positioned much further back than point 810.

To prevent such an error the depth map entries of points 815 and 810 may be compared. These would reveal the difference in positions between these two points, as ray 820 must travel a much shorter distance to reach point 810 than ray 825 must travel to reach point 815. Thus, some embodiments of the present invention may compare depth map values in order to determine which points of a photon map are within a predefined radius of a pixel that is being rendered. Furthermore, depth map values may be used in combination with comparative positions within the photon map in order to determine distances between various points and the pixel for the purposes of computing the decay function of equation EQ1.

While the above description centers on determining second order color, embodiments of the present invention further include functionality for determining first order color. As noted above this functionality may be based on any known rendering methods, including various direct illumination methods. Furthermore, the system and methods discussed in the '031 application may be used to determine first order color.

The embodiments discussed herein may be implemented as software running on a computer. Furthermore, these embodiments may be implemented as hardware only computing devices or a combination of software and hardware. In most embodiments, the computer device which implements the embodiments may include an interface which allows an artist or a user to set up scenes by creating or importing various objects, placing them in an environment, placing various light sources and or translucent objects in the environment, etc. The computer device may also include an interface that provides a picture or a video of the rendered scene.

In some cases, the scenes may be set up automatically by the computing device itself. For example, an embodiment of the present invention may be used to render a virtual environment or a video game. In such a case, the various scenes may be automatically set up by the computer device depending on events that are occurring in the virtual environment or video game. Therefore, in some embodiments most actions discussed herein as being performed by users, artists or operators, may be performed by suitable programmed computers instead.

Some embodiments of the present invention may be implemented on computing devices of high computing power. For example, some embodiments may be implemented on a supercomputer or a distributed computer. Other embodiments may be implemented on personal computers, video game machines, portable computers, etc.

Figure 9:
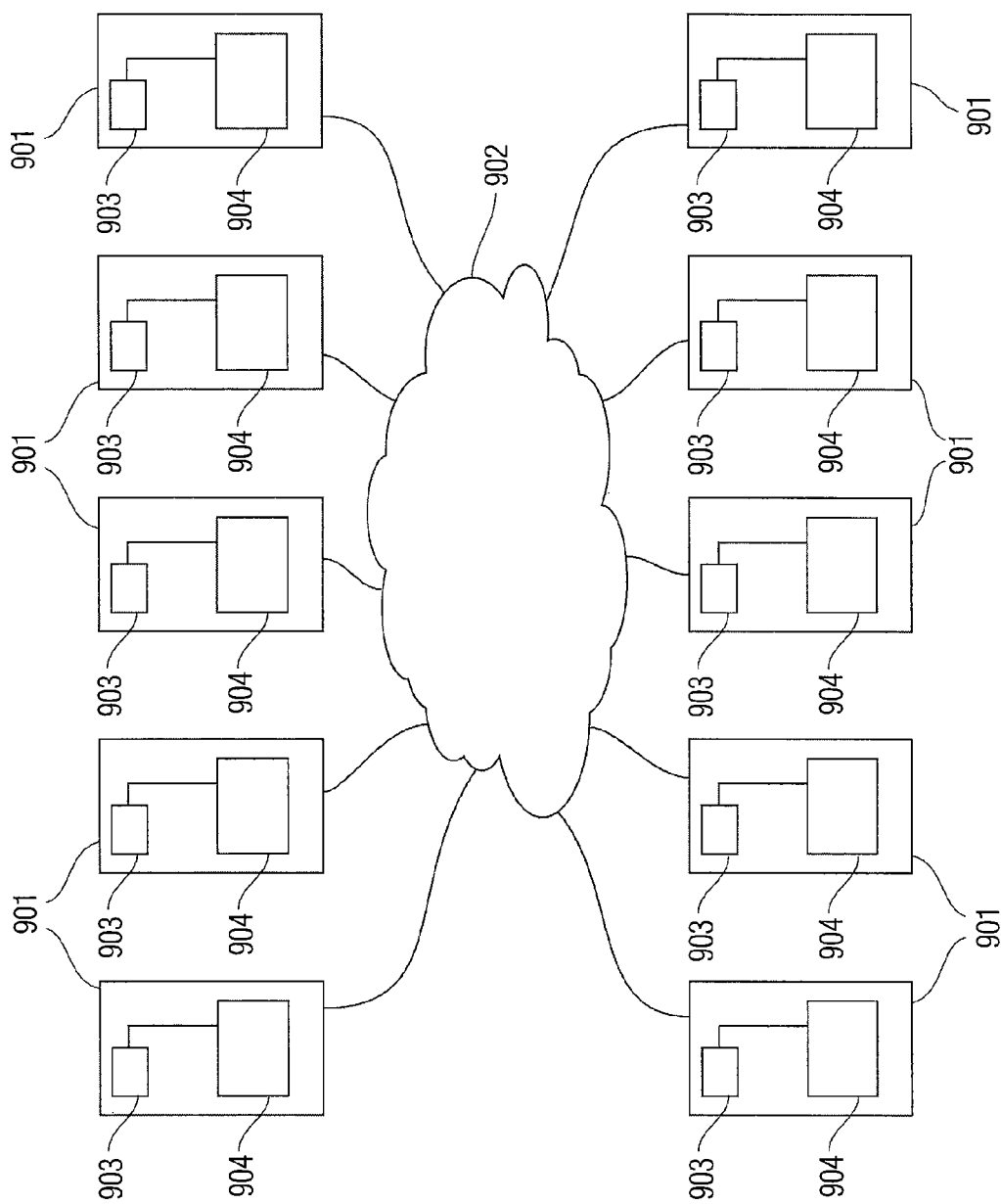
FIG. 9 is a diagram of an exemplary distributed system according to some embodiments of the present invention.

FIG. 9 shows an embodiment implemented on a distributed computer system. In the distributed computing example of FIG. 9, a plurality of computers 901 execute a software application implementing the present invention in parallel. Each computer 901 includes a processor 903 and memory 904. The computers may render different portions of a scene or different scenes in parallel. The computers communicate through a network 902. The software application may exist in its entirety in the memory 903 of a single computer 901, or alternatively portions of it may be stored and executed at one or more computers. Managing components of the software application running on one or more of the computers may create and assign various tasks to other portions of the software application running on the same or other computers. The multiple computers may be positioned in proximity to each other or they may be located remotely and connected through a pervasive network, such as the Internet.

Although the present invention has been fully described in connection with embodiments thereof with reference to the accompanying drawings, it is to be noted that various changes and modifications will become apparent to those skilled in the art. Such changes and modifications are to be understood as being included within the scope of the present invention as defined by the appended claims.

We claim:

1. A method for rendering a scene comprising the steps of:
providing a pixel to be rendered, the pixel being associated with a first point on a translucent object's surface, the translucent object being part of the scene;
determining a first order color of the pixel, wherein the determination of the first order color is an approximation that does not sufficiently take subsurface scattered light into account;
generating, using a processor, a photon map, the photon map including values of colors of a plurality of points within the scene and providing at least some information relating to the position of each of the plurality of points within the scene, wherein said values of colors that are included by the photon map are derived through direct illumination methods only;
generating a second order color by:
generating a first component of the second order color, the first component based on data from the photon map associated with a first plurality of selected points from the plurality of points, wherein one of the first plurality of selected points is the first point, the first component representing the contribution of subsurface scattered light over a first area illuminated by rays originating from a camera side of the translucent object;

generating a second component of the second order color, the second component based on data from the photon map associated with a second plurality of selected points from the plurality of points, wherein one of the second plurality of selected points is a second point on the translucent object's surface opposite to the first point, the second component representing the contribution of subsurface scattered light over a second area illuminated by rays originating from a side opposite the camera side of the translucent object, wherein one of the rays originating from a side opposite the camera side would enter the translucent object at the second point, pass through the translucent object, and exit at the first point; and decaying the second component based on a distance between the first area and the second area of the translucent object; and adding the first and second components in order to take subsurface scattered light into account.

2. The method of claim 1, wherein generating the second order color further includes:

selecting the first plurality of selected points from the plurality of points based on the position of each of the first plurality of selected points in relation to the pixel;

decaying each of the colors of the plurality of selected points based on a predefined decay function and the distance between each of the plurality of selected points and the pixel; and integrating the decayed colors of the plurality of selected points to generate the second order color.

3. The method of claim 1, wherein generating the photon map further includes:

tracing direct light rays from one or more light sources to one or more of the plurality of points within the scene; and determining colors for one or more of the plurality of points by deriving the color of a respective point from the plurality of points only on light sources whose rays have been traced to the respective point.

4. The method of claim 1, wherein generating the photon map includes defining respective three dimensional positions for each point of the plurality of points within the photon map.

5. The method of claim 1, wherein generating the photon map includes providing at least one two dimensional array, wherein entries within the array are associated with respective points from the plurality of points; and the position of a first entry within the array provides data as to the position of a respective point of the plurality of points in the scene, said point being associated with the first entry.

6. The method of claim 5, wherein a depth map entry associated with the first entry in combination with the position of the first entry in the array defines the position of the point associated with the first entry in the scene.

7. A computer readable medium comprising a plurality of instructions, the instructions being configured to be executed at a computer and to cause the computer to perform a method for rendering a scene comprising the steps of:

providing a pixel to be rendered, the pixel being associated with a first point on a translucent object's surface, the translucent object being part of the scene;

determining a first order color of the pixel, wherein the determination of the first order color is an approximation that does not sufficiently take subsurface scattered light into account;

generating a photon map, the photon map including values of colors of a plurality of points within the scene and providing at least some information relating to the position of each of the plurality of points within the scene, wherein said values of colors that are included by the photon map are derived through direct illumination methods only;

generating a second order color by:

generating a first component of the second order color, the first component based on data from the photon map associated with a first plurality of selected points from the plurality of points, wherein one of the first plurality of selected points is the first point, the first component representing the contribution of subsurface scattered light over a first area illuminated by rays originating from a camera side of the translucent object;

generating a second component of the second order color, the second component based on data from the photon map associated with a second plurality of selected points from the plurality of points, wherein one of the second plurality of selected points is a second point on the translucent object's surface opposite to the first point, the second component representing the contribution of subsurface scattered light over a second area illuminated by rays originating from a side opposite the camera side of the translucent object, wherein one of the rays originating from a side opposite the camera side would enter the translucent object at the second point, pass through the translucent object, and exit at the first point; and decaying the second component based on a distance between the first area and the second area of the translucent object; and adding the first and second components in order to take subsurface scattered light into account.

8. The computer readable medium of claim 7, wherein generating the second order color further includes:

selecting the first plurality of selected points from the plurality of points based on the position of each of the first plurality of selected points in relation to the pixel;

decaying each of the colors of the plurality of selected points based on a predefined decay function and the distance between each of the plurality of selected points and the pixel; and integrating the decayed colors of the plurality of selected points to generate the second order color.

9. The computer readable medium of claim 7, wherein generating the photon map comprises:

tracing direct light rays from one or more light sources to one or more of the plurality of points within the scene; and determining colors for one or more of the plurality of points by deriving the color of a respective point from the plurality of points only on light sources whose rays have been traced to the respective point.

10. The computer readable medium of claim 7, wherein generating the photon map includes defining respective three dimensional positions for each point of the plurality of points within the photon map.

11. The computer readable medium of claim 7, wherein generating the photon map includes providing at least one two dimensional array, wherein entries within the array are associated with respective points from the plurality of points; and the position of a first entry within the array provides data as to the position of a respective point of the plurality of points in the scene, said point being associated with the first entry.

12. The computer readable medium of claim 11, wherein a depth map entry associated with the first entry in combination with the position of the first entry in the array defines the position of the point associated with the first entry in the scene.

13. A system for rendering a scene comprising a processor and a memory, the memory comprising a plurality of instructions executable by the processor, the instructions being configured to cause the processor to:
provide a pixel to be rendered, the pixel being associated with a first point on a translucent object's surface, the translucent object being part of the scene;
determine a first order color of the pixel, wherein the determination of the first order color is an approximation that does not sufficiently take subsurface scattered light into account;
generate a photon map, the photon map including values of colors of a plurality of points within the scene and providing at least some information relating to the position of each of the plurality of points within the scene, wherein said values of colors that are included by the photon map are derived through direct illumination methods only;
generate a second order color by further causing the processor to:
generate a first component of the second order color, the first component based on data from the photon map associated with a first plurality of selected points from the plurality of points, wherein one of the first plurality of selected points is the first point, the first component representing the contribution of subsurface scattered light over a first area illuminated by rays originating from a camera side of the translucent object;
generate a second component of the second order color, the second component based on data from the photon map associated with a second plurality of selected points from the plurality of points, wherein one of the second plurality of selected points is a second point on the translucent object's surface opposite to the first point, the second component representing the contribution of subsurface scattered light over a second area illuminated by rays originating from a side opposite the camera side of the translucent object, wherein one of the rays originating from a side opposite the camera side would enter the translucent object at the second point, pass through the translucent object, and exit at the first point; and
decay the second component based on a distance between the first area and the second area of the translucent object; and
add the first and second components in order to take subsurface scattered light into account.

14. The system of claim 13, wherein generating the second order color further includes:
selecting the first plurality of selected points from the plurality of points based on the position of each of the first plurality of selected points in relation to the pixel;
decaying each of the colors of the plurality of selected points based on a predefined decay function and the distance between each of the plurality of selected points and the pixel; and
integrating the decayed colors of the plurality of selected points to generate the second order color.

15. The system of claim 13, wherein generating the photon map further includes:
tracing direct light rays from one or more light sources to one or more of the plurality of points within the scene; and
determining colors for one or more of the plurality of points by deriving the color of a respective point from the plurality of points only on light sources whose rays have been traced to the respective point.

16. The system of claim 13, wherein generating the photon map includes defining respective three dimensional positions for each point of the plurality of points within the photon map.

17. The method of claim 13, wherein generating the photon map includes providing at least one two dimensional array, wherein
entries within the array are associated with respective points from the plurality of points; and
the position of a first entry within the array provides data as to the position of a respective point of the plurality of points in the scene, said point being associated with the first entry.

18. The system of claim 17, wherein a depth map entry associated with the first entry in combination with the position of the first entry in the array defines the position of the point associated with the first entry in the scene.

19. The system of claim 13, wherein the system is a distributed computer system.

* * * * *